(12) United States Patent
Kovish et al.

(10) Patent No.: US 7,200,580 B1
(45) Date of Patent: Apr. 3, 2007

(54) SYSTEM AND METHOD FOR RUN-TIME DATA REDUCTION

(75) Inventors: Barrie Kovish, Coquitlam (CA); John Michael Miller, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 547 days.

(21) Appl. No.: 10/670,581

(22) Filed: Sep. 25, 2003

(51) Int. Cl.
*G06F 15/18* (2006.01)

(52) U.S. Cl. .............................. 706/12; 706/14; 706/46

(58) Field of Classification Search ................. 706/12, 706/14, 46; 700/28
See application file for complete search history.

(56) References Cited

U.S. PATENT DOCUMENTS

| | | | | |
|---|---|---|---|---|
| 6,145,001 A | * | 11/2000 | Scholl et al. ................ | 709/223 |
| 6,615,091 B1 | * | 9/2003 | Birchenough et al. ........ | 700/96 |
| 6,618,117 B2 | * | 9/2003 | Silverbrook ................. | 355/18 |
| 6,728,262 B1 | * | 4/2004 | Woram ........................ | 370/466 |
| 2003/0014322 A1 | * | 1/2003 | Kreidler et al. ................ | 705/26 |
| 2003/0014498 A1 | | 1/2003 | Kreidler et al. | |
| 2003/0023336 A1 | * | 1/2003 | Kreidler et al. ............. | 700/108 |
| 2003/0144746 A1 | * | 7/2003 | Hsiung et al. ................ | 700/28 |
| 2003/0158615 A1 | * | 8/2003 | Weber et al. ................. | 700/96 |
| 2004/0021679 A1 | * | 2/2004 | Chapman et al. ............ | 345/700 |
| 2004/0024483 A1 | * | 2/2004 | Holcombe ................... | 700/122 |
| 2004/0044748 A1 | | 3/2004 | Iris et al. | |

* cited by examiner

*Primary Examiner*—Joseph P Hirl
(74) *Attorney, Agent, or Firm*—Amin Turocy & Calvin LLP; William R. Walburn

(57) ABSTRACT

The present invention generally relates to industrial automation, and in particular to systems and methods that facilitate rendering data in an industrial automation environment. Specifically, the invention gathers data via a high-speed data collection device and transmits high-resolution data to a trend server. A trend server can batch or buffer the high-resolution data for transmission to a user interface, such as a Human Machine Interface. A run-time reduction modulo m ($RTR^m$) component can index data to permit a reduction in data read time. A user interface can render the data at high resolution to provide the user with a real-time, seamless display of information.

46 Claims, 14 Drawing Sheets

SYSTEM AND METHOD FOR RUN-TIME DATA REDUCTION

TECHNICAL FIELD

The present invention relates generally to industrial control systems, and more particularly to a systems and methodologies that facilitate rendering data in an industrial automation environment.

BACKGROUND OF THE INVENTION

Industrial control systems have enabled modern factories to become partially or completely automated in many circumstances. These systems generally include a plurality of Input and Output (I/O) modules that interface at a device level to switches, contactors, relays and solenoids along with analog control to provide more complex functions such as Proportional, Integral and Derivative (PID) control. Communications have also been integrated within the systems, whereby many industrial controllers can communicate via network technologies such as Ethernet, Control Net, Device Net or other network protocols and also communicate to higher level computing systems. Generally, industrial controllers utilize the aforementioned technologies along with other technology to control, cooperate and communicate across multiple and diverse applications.

At the core of the industrial control system is a logic processor such as a Programmable Logic Controller (PLC). PLCs are programmed by systems designers to operate manufacturing processes via user-designed logic programs or user programs. User programs are stored in memory and generally executed by a PLC in a sequential manner, although instruction jumping, looping, and interrupt routines, for example, are also common. Associated with user programs are a plurality of memory elements or variables that provide dynamics to PLC operations and programs. Such variables can be user-defined and can be defined as bits, bytes, words, integers, floating point numbers, timers, counters and/or other data types to name but a few examples.

Industrial controllers and associated control systems have increasingly become more sophisticated and complicated as control applications have been distributed across the plant floor and, in many cases, across geographical or physical boundaries. As an example, multiple controllers and/or other devices can communicate and cooperate to control one or more aspects of an overall manufacturing process via a network, whereas other devices can be remotely located yet still contribute to the same process. In other words, control applications have become less centrally located on a singular control system having associated responsibilities for an entire operation. Thus, distribution of an overall control function and/or process frequently occurs across many control components, systems or devices.

Human governance of control processes and/or functions is often difficult to orchestrate. In order for systems to be accurately monitored, system interfaces can be created and maintained. Hardware interfaces are merely linkages consisting of wires, plugs, sockets, etc. Through these interfaces, hardware devices communicate with one another. Software interfaces are composed of languages and/or codes used by systems for application-to-application communication and for communication between an application and a given hardware device. All such interfaces permit real-time communication between respective participants without any appreciable latent period. However, user interfaces, which permit communication between a user and an operating system, are often inefficient due to processing required to permit human interpretation and response. A user interface can be, for example, a mouse, a keyboard, a stylus, a monitor, a screen menu, an audio signal, or any other suitable input or output device.

One such user interface is a Human Machine Interface (HMI). Current HMIs are typically limited in resolution capabilities when compared to the relatively high resolution of data made available to a HMI via, for example, a PLC. For instance, a PLC scans incoming data, outputs information associated with such data at high resolution, and pushes it to a HMI, such as a graphical display. The HMI thereafter attempts to display the high-resolution data. While data is processed, a latent period occurs, during which further information sent by a PLC to a HMI might be ignored. Until and unless HMI data capture rates begin to approach those of the PLC, there is an unmet need in the art for systems and methods that mitigate the wide discrepancy there between.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for systems and methods that facilitate rendering high-resolution data via a Human Machine Interface (HMI), which typically does not embrace high-resolution capabilities of hardware counterparts associated therewith. Thus, the invention mitigates latency associated with high-resolution data output from a hardware device(s) that must be rendered via HMI software. According to an aspect of the present invention, a dedicated server is provided that buffers data relayed from a hardware device prior to serving it to a HMI, representing a novel approach to narrowing and/or mitigating the gap between the resolution level typically displayed by a HMI and the resolution level of data produced by a hardware device associated with such HMI. For example, a Programmable Logic Controller (PLC) is capable of data capture at millisecond frequencies; however, conventional networks and associated HMI software are out-paced by the data capture rates of the PLC.

According to another aspect of the invention, data is captured via a hardware device (e.g. a PLC) and fed to a trend server. A trend server can be, for example, a periodic monitor that can sample incoming data and generate a log file of sample data. The trend server in turn feeds the sample data to a HMI. According to one particular aspect of the invention, a trend server can compress data and render the compressed data to a HMI. It is to be appreciated that a trend server can also simply collect and batch data (e.g. without performing any analysis or compression thereof) and send batched data to a HMI, thereby mitigating bandwidth deficiencies associated with conventional networks. By having a priori knowledge of latent periods associated with batching data via a trend server, and by accounting for such latent periods, a HMI can display data to a user at high resolution in an effective and continuous manner.

Another aspect of the invention provides for a high-speed time series data analysis on subsets of data. Time series data is highly autocorrelated, which permits extremely accurate prediction and forecast. Autocorrelation is a correlation coefficient that measures the regularity of a signal. By employing an autocorrelation method in a time series data analysis of data subsets, the present invention can determine whether randomness exists in a data subset. If a data subset is determined to be nonrandom, the invention can further employ an autocorrelation method to determine a correct time series model.

According to another aspect of the invention, a system is disclosed as discussed in "DataLogger Performance Enhancement RTR$^m$", a paper relating to run-time data reduction. This aspect of the invention provides for data capture at high resolution and data logging at a hierarchy of resolutions (e.g., 1 data point can be logged for every 1, 10, 100, 1000 etc. data points that are captured), thus indexing data to provide an overview of such data. Thus, an index itself can represent an entire data set. Furthermore, an index permits data to be rendered via the index to facilitate trending of the data in an efficient manner.

Yet another aspect of the present provides for viewing live data in real time. Real-time data can be presented in a seamless manner, such that a user can scroll back and forth along the data. This aspect permits the user to access historical data, for example, simply by manipulating a scroll bar presented via the HMI. Thus, a user can advantageously and readily access information history in a continuous manner.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
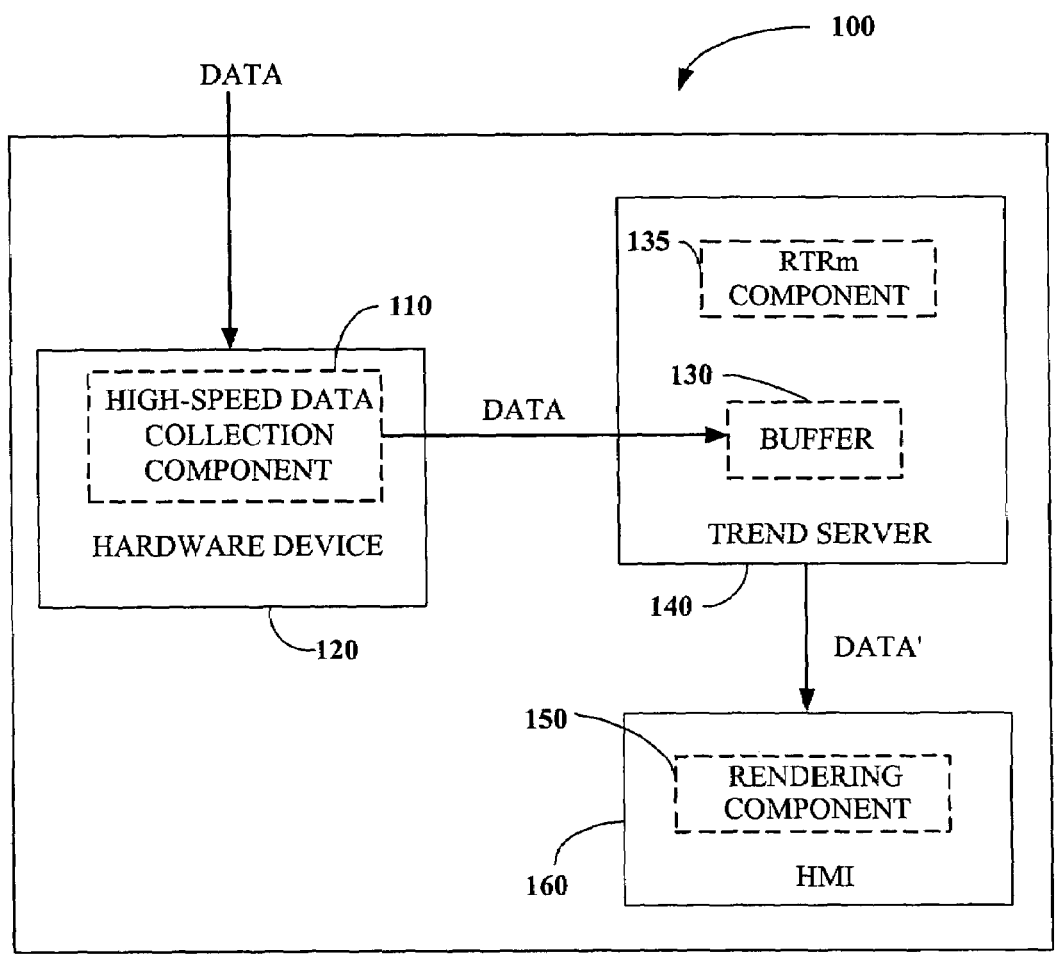
FIG. 1 is an illustration of a block diagram of a system for run-time data reduction that incorporates a buffer and a trend server in accordance with an aspect of the present invention.

The present invention will now be described with reference to the drawings, wherein like reference numerals are used to refer to like elements throughout. The present invention will be described with reference to systems and methods for rendering high-resolution data to a user in real time. It should be understood that the description of these exemplary aspects are merely illustrative and that they should not be taken in a limiting sense.

The term "component" refers to a computer-related entity, either hardware, a combination of hardware and software, software, or software in execution. For example, a component can be a process running on a processor, a processor, an object, an executable, a thread of execution, a program and a computer. By way of illustration, both an application running on a server and the server can be components. A component can reside in one physical location (e.g., in one computer) and/or can be distributed between two or more cooperating locations (e.g., parallel processing computer, computer network).

It is to be appreciated that various aspects of the present invention can employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks can be employed.

FIG. 1 is an illustration of a system 100 according to an aspect of the present invention, in which high-resolution data is collected by a high-speed data collection component 110 in a hardware device 120. The high-speed data collection component 110 can be, for example, a Programmable Logic Controller (PLC), a Distributed Control System (DCS), a "soft" PLC, or any other suitable device for collecting data at high speeds.

The present invention can collect data at variable rates, and a rate of at least 1 sample per second per tag is contemplated. A tag is defined as single item (e.g., piece of equipment) being monitored. According to one example, the high-speed data collection component can collect data at a rate of approximately 200 samples per second per tag.

Once the high-speed data collection component 110 has gathered data, the collected data is sent to a buffer 130 associated with a trend server 140. The trend server 140 is further associated with a RTR$^m$ component 135 that can index data samples to permit reduced read-time. The RTRm component 135 can provide a vast increase in draw speed while requiring only a modest increase in memory (discussed in detail with regard to FIG. 6, infra). The trend server 140 periodically monitors incoming data and creates a log of sampled data. The trend server 140 can then read the log file and graphically represent the data contained therein. The trend server 140 contemplated by the present invention can be, for example, a trend server physically coupled to both the high-speed data collection component and to a HMI. Additionally, the trend server 140 can be a remote trend server, whereby data is made available, for example, via a Universal Resource Locator (URL) and/or a web server.

The buffer 130 located within the trend server 140 typically serves as temporary storage for data while other data is being processed. Buffers are most commonly employed, for example, in situations where the transmission capabilities of network subsystems cannot keep pace with the generation of information. Buffers are also commonly employed, for example, when various information units are in competition with each other for resource availability. The size of the buffer can be a factor in determining overall system performance, latency, and real-time processing.

According to an aspect of the present invention, information is sent to the buffer 130 via utilizing the synchronous transmission mode, wherein digital information is parsed into "packets" having a fixed length, wherein time is parsed into "slots" of fixed uniform length, and wherein the transmission of a single packet of data is performed during the span of a single slot of time. Thus, time slot end-points delineate information packet end-points. Accordingly, when a stream of digital information enters the buffer, it is characterized by the specific number of arriving data packets. For example, a given message can be composed of a variable number of packets of a fixed length. Based on the identity of a given incoming message, the buffer 130 can make a priority determination of whether to temporarily store the information or forward it to a HMI 160 for rendering in a meaningful manner.

The buffered data is then transmitted to a rendering component 150 within the HMI 160. The rendering component 150 facilitates the presentation of HMI objects and data associated therewith. HMI objects are visual entities representing particular machine components and/or particular process actions. HMI objects can include but are not limited to graphical depictions of machine components and/or functional descriptions of methodologies. For example, an image of a valve as well as a functional block describing actions desirably taken by a valve can both be HMI objects in accordance with an aspect of the present invention. The HMI objects can be stored and displayed in a location accessible by a user for editing and manipulation of function objects. For example, a library of HMI objects can be displayed on a monitor via a HMI and stored within a data store (not shown).

The HMI 160 itself can be a fixed HMI, for example, such as a graphical interface on a stationary monitor used in conjunction with a personal and/or industrial computer. According to another example, the HMI 160 can be a tethered portable HMI, such as the Machine Terminal MT750 or the Guard Terminal G750, both manufactured by Allen-Bradley. A tethered portable HMI offers several advantages over the fixed HMI; the most important being increased mobility to manually inspect the plant floor with the HMI in hand, thus permitting increased productivity. For example, an operator using a tethered portable HMI can respond to alarms and/or adjust machine settings with the HMI in hand. Increased mobility further enables greater troubleshooting capability and reduced set up time.

According to yet another example, the HMI 160 can be a wireless HMI, such as the Allen-Bradley MobileView Tablet T750. A wireless HMI offers even greater mobility than the tethered portable wireless, and its range can be extended by distributing additional base stations throughout a large plant. In this manner, an operator can access information regarding a given machine and control the machine from any point in the plant. Furthermore, MobileView operates on a thin client platform, which permits facilitated integration to new or extant control architectures. By utilizing this technology, the wireless MobileView can act as a thin client to computer applications such as, for example, the Rockwell Software RSView family of software. Because communication with the server can occur via an Ethernet link, this aspect of the present invention advantageously reduces hardware and software costs.

Figure 2:
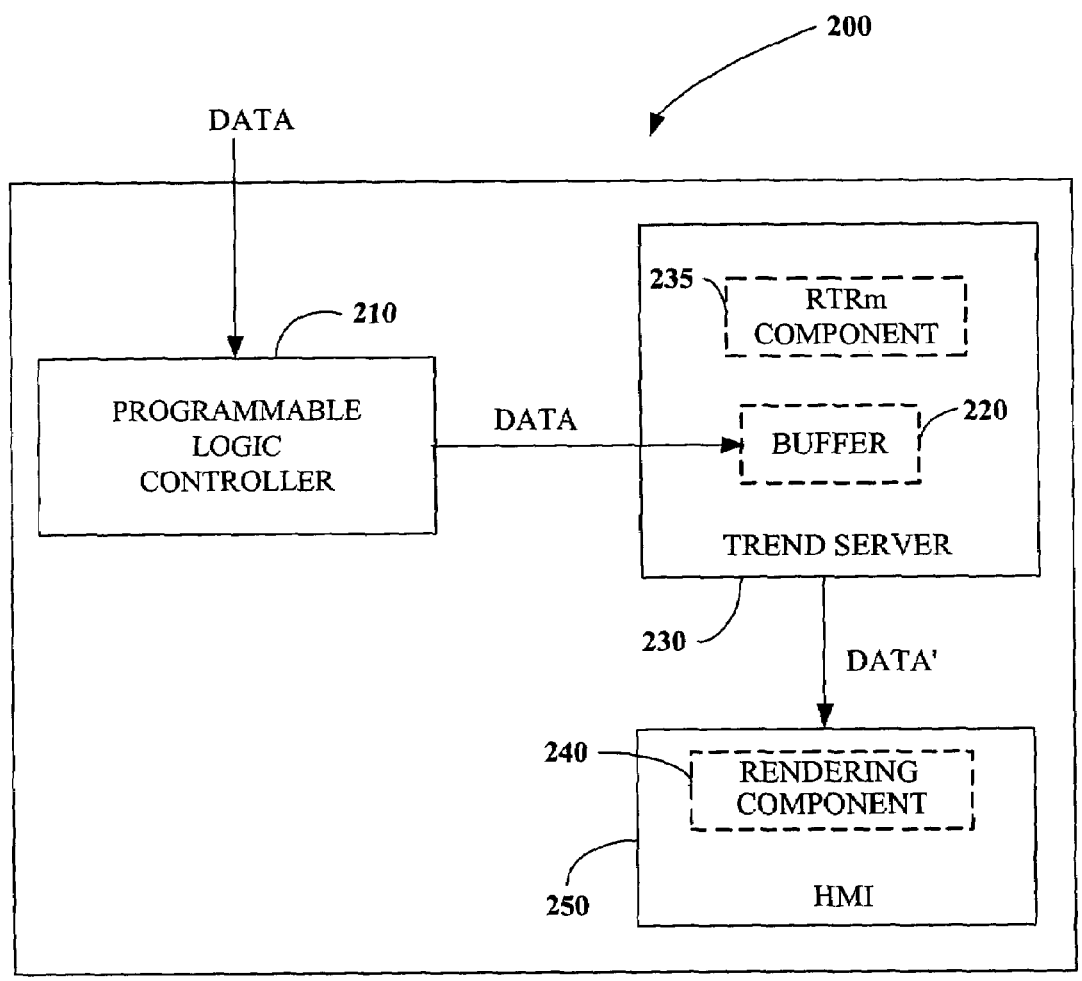
FIG. 2 is an illustration of a block diagram of a system for run-time data reduction that incorporates a Programmable Logic Controller in accordance with an aspect of the present invention.

FIG. 2 is an illustration of a system 200 according to an aspect of the present invention in which the high-speed data capture component is a PLC 210. The PLC 210 has high-speed data collecting capability. The PLC 210 is operably coupled to a buffer 220 associated with a trend server 230. The trend server 230 is further associated with a RTR$^m$ component 235 that can index data samples to permit reduced read-time (discussed in detail with regard to FIG. 6, infra). The trend server 230 is further operably coupled to a rendering component 240 associated with a HMI 250.

A PLC is a solid state control system with a memory that can be programmed by a user to execute specific functions, such as I/O control, logic, timing, counting, report generation, communication, arithmetic and data file manipulation. A controller comprises a central processing unit, I/O interface(s), and a memory. A typical controller is designed with regard to an industrial control system. A PLC comprises integrated circuits, as opposed to electromechanical devices, and thus is capable of withstanding harsh environmental conditions with improved reliability. It is to be understood, however, that the present invention is not limited to PLCs or to a high-speed data collection component that utilizes integrated circuits, but rather embraces any suitable data collection component design.

A typical PLC operates by continuously scanning its inputs and, depending on their respective states, turning its outputs on or off. In a typical PLC, binary code is used such that input conditions are represented by a binary value of 1 or 0, respectively representing a true or false condition. Once a PLC has scanned its inputs, their respective conditions are stored in a memory. The PLC does not immediately react to the information it collects, but rather continues to execute its control program. Once the PLC has scanned every program command, it proceeds to initiate the proper output signals (e.g. "on" or "off"). Once this part of the PLC's procedure is complete, the PLC analyzes its own system for errors. Upon ascertaining that no errors exist in its operating system, the PLC proceeds to begin scanning its inputs anew.

Figure 3:
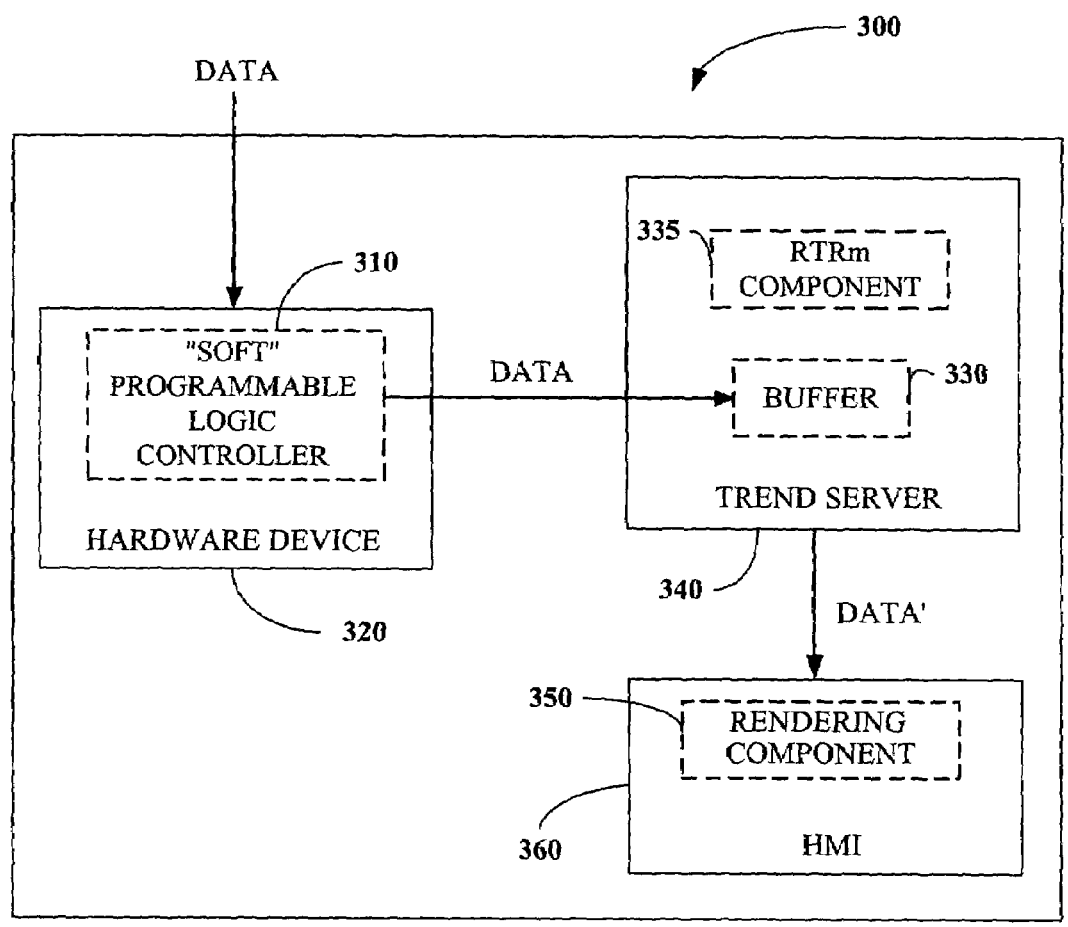
FIG. 3 is an illustration of a block diagram of a system for run-time data reduction that incorporates a "soft" Programmable Logic Controller in accordance with an aspect of the present invention.

FIG. 3 is an illustration of a block diagram of a system 300 according to another aspect of the present invention. A soft PLC 310 is associated with a hardware device 320. The soft PLC 310 and/or hardware device 320 are operably coupled to a buffer 330 associated with a trend server 340, which is further associated with a RTR$^m$ component 335. The RTR$^m$ component can index data samples to permit a reduction in data read time, as is described in greater detail with reference to FIG. 6. The trend server 340 and/or buffer 330 are operably coupled to a rendering component 350 associated with a HMI 360. A soft PLC is a computer-run program that mimics the behavior and/or operation of a standard PLC. The physical form of a soft PLC can be widely varied. For example, the soft PLC 310 can be a simple open architecture PLC. In another example, a soft PLC co-processor card can be installed in a PLC backplane, or a PLC co-processor card can be installed in a soft PLC backplane, to serve the function of a traditional PLC. According to yet another example, a PC can run a "soft" PLC control application while operably coupled to a distributed and/or remote I/O network(s). Advantages associated with using a soft PLC for industrial control are, for example, wireless capabilities, HMI functionality in the same platform, networking to higher-level platforms, complex process simulation, increased ability to manipulate databases, advanced control algorithms, etc.

Figure 4:
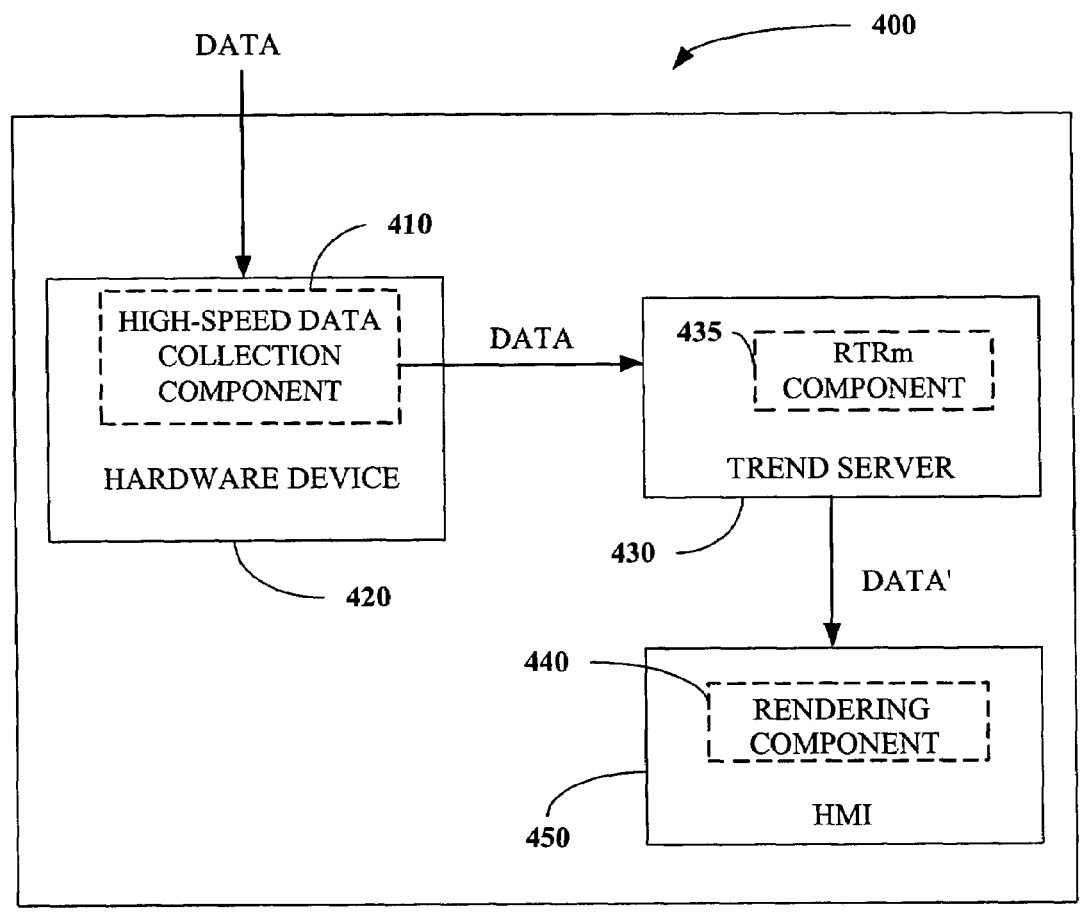
FIG. 4 is an illustration of a block diagram of a system for run-time data reduction in accordance with an aspect of the present invention.

FIG. 4 is an illustration of a block diagram of a system 400 according to an aspect of the present invention, wherein the trend server does not contain a buffer. This aspect of the invention contemplates a high-speed data collection device 410 associated with a hardware device 420. The high-speed data collection device 410 and/or the hardware device 420 are operably coupled to a trend server 430. The trend server 430 is further associated with a RTR$^m$ component 435 that can index data samples to permit reduced read-time (discussed in detail with regard to FIG. 6, infra). The trend server 430 is in turn operably coupled to a rendering component 440 and associated HMI 450. With respect to this aspect, the trend server 430 can collect and batch data for transmission to the HMI 450 without performing any analysis of the collected data. This aspect of the present invention is advantageous in that it mitigates the bandwidth deficiencies associated with conventional networks. Furthermore, this aspect of the invention contemplates that the HMI 450 can have a priori knowledge of the latent period associated with data batching via the trend server 430, and that the HMI 450 can account for the period of latency in a manner that permits the HMI 450 to render the data at high resolution in an effective and continuous manner. For example, the HMI 450 can be aware that when the trend server 430 batches a set of data, that data is delayed by x milliseconds. The HMI 450 can then render incoming data at a rate sufficient to account for and eliminate any latent period in the HMI's output, so that the user sees only a continuous, high-resolution display of data.

Figure 5:
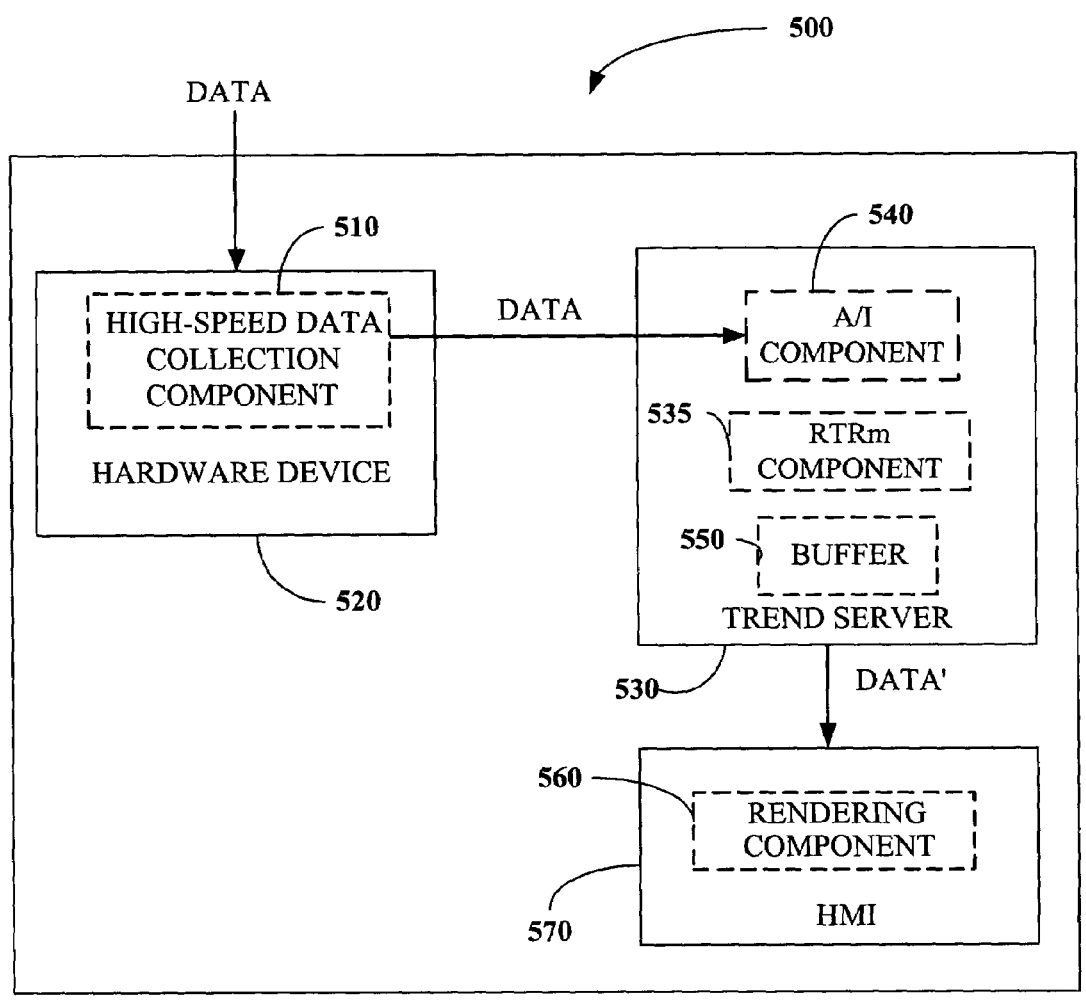
FIG. 5 is an illustration of a block diagram of a system for run-time data reduction that incorporates an artificial intelligence component in accordance with an aspect of the present invention.

FIG. 5 is an illustration of a system 500 in accordance with an aspect of the present invention. The system 500 can employ various inference schemes and/or techniques in connection with rendering data at high resolution. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to prognostic techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention. Furthermore, trainable classifier(s) can be employed to facilitate making inferences that increase system efficiency. Classifiers can be trained either implicitly (e.g. in response to user action) or explicitly, or both.

Still referring to FIG. 5, the system 500 comprises a high-speed data collection component 510 and associated hardware device 520, which collects data and transmits it to a trend server 530. The trend server 530 is associated with a RTRm component 535 that can reduce data read time, and an artificial intelligence (A/I) component 540 that is operably coupled to a buffer 550. The trend server is further operably coupled to a rendering component 560 associated with a HMI 570. It is to be understood that the A/I component 540 of the present invention can be associated with the trend server 530, the HMI 570, the data collection component 520, or any combination thereof, and is not limited to being associated with the trend server 530 only.

The A/I component 540 is capable of making inferences regarding whether incoming data needs to be buffered before it is transmitted to the rendering component 560 in the HMI 570. Such determination can be based on, for example, priority of the data (e.g. whether the data represents a fault condition, etc.), volume of the data (e.g., whether there is too much data to be seamlessly rendered at high resolution), etc. If the A/I component 540 determines that the data requires buffering before transmission to the rendering component 560, then the data can be routed to the buffer 550 prior to transmission. The buffer 550 can temporarily store some data while permitting other data to be transmitted so that the rendering component 560 can output the data to a user via the HMI 570 in a seamless and high-resolution display. If the A/I component 540 determines that the data does not require buffering, then the buffer 550 can be bypassed. In this case, the trend server 530 can batch the data for transmission to the rendering component 560 of the HMI 570. The rendering component 560 can then display the batched data in meaningful, seamless, and high-resolution manner to the user.

According to another aspect of the invention, the A/I component 540 can employ various means for increasing system efficiency. Among such means contemplated by the present invention are, for example, buffer size adjustment, sample rate adjustment, utility-based analysis, etc. For instance, if the A/I component 540 determines that an incoming data stream is larger than expected, the buffer 550 can be expanded to accommodate and temporarily store the larger volume of data. Additionally, if a data stream exhibits a decreased volume, the A/I component 540 can make inferences that facilitate a reduction in the size of the buffer 550 in order to make memory available for other applications. In a similar manner, sample rate can be altered in response to inferences made by the A/I component 540 regarding a particular resolution for rendering data. For example, if inferences made by the A/I component 540 indicate that a user requires only a limited amount of information (e.g., a single FIGURE), then the data sample rate can be reduced to permit a more efficient (e.g., more rapid) rendering of data to the user. Similarly, if inferences indicate that a user requires a high level of resolution, then the sample rate can be increased to provide greater detail.

Utility-based analysis can be employed by the A/I component 540 and can be based on, for example, user preferences with respect to cost-benefit analysis. To further this example, cost-benefit analysis can be based upon, for instance, information relating to the necessity of rendering high-resolution data to a user versus taxing system resources. If several pieces of equipment are being monitored concurrently and a user only requires limited information regarding one of the pieces of equipment, then a high-resolution rendering of the data associated with that piece of equipment can be inefficient. Furthermore, the urgency and/or priority of particular data (e.g., data representing an alarm or fault condition) can be inferred by the A/I component 540 to facilitate enhanced functionality of the present system. Additionally, a user profile can be employed to facilitate inferences regarding user preferences and can comprise, for example, historical usage, etc.

Figure 6:
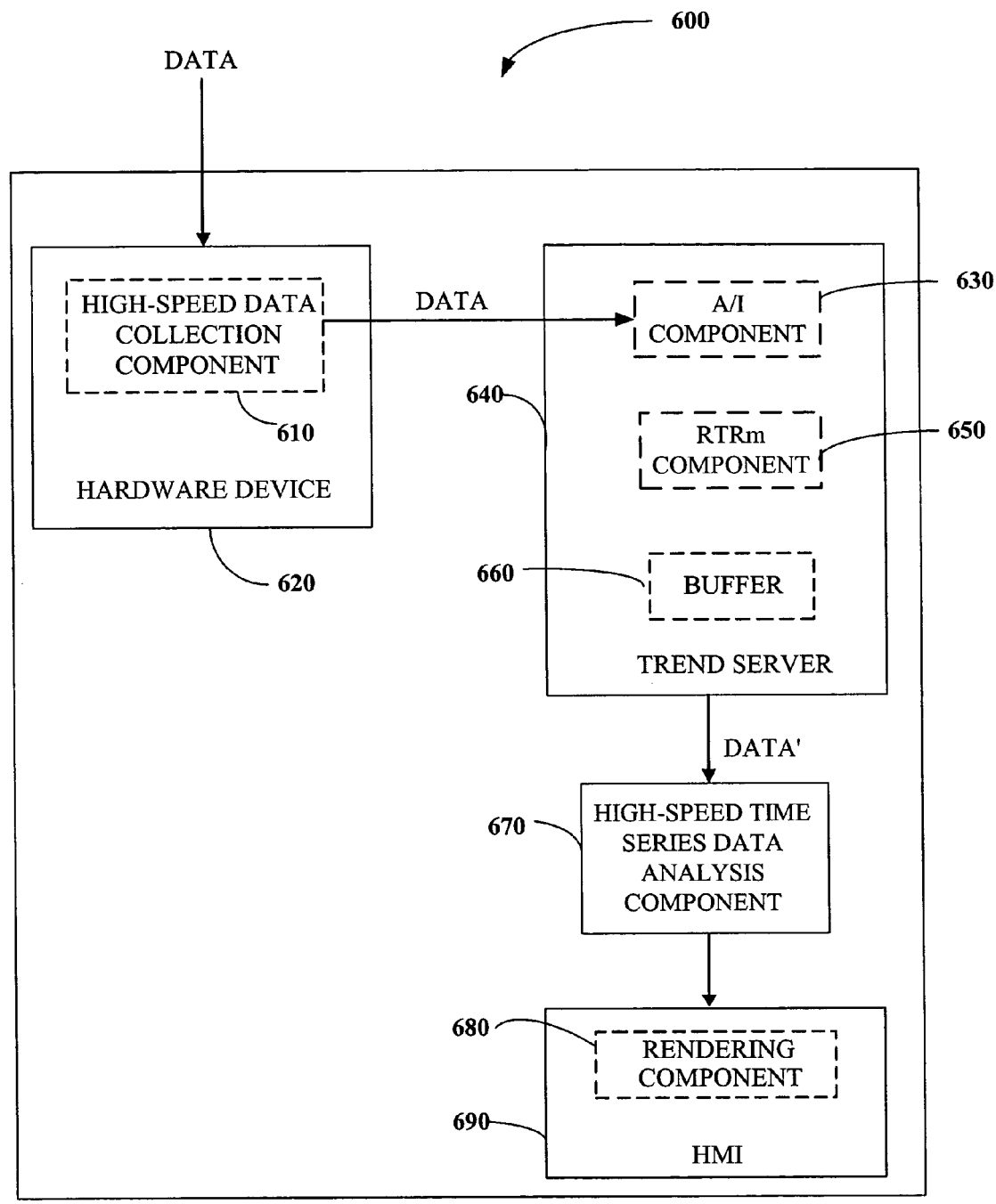
FIG. 6 is an illustration of a block diagram of a system for run-time data reduction that incorporates a high-speed time series data analysis component in accordance with an aspect of the present invention.

FIG. 6 illustrates a system 600 that incorporates a high-speed time series data analysis component according to an aspect of the present invention. Data is collected via a high-speed data collection component 610 associated with a hardware device 620. The high-speed data collection component 610 and/or the hardware device 620 are operably coupled to an A/I component 630, which is in turn associated with a trend server 640. The trend server 640 is also associated with an RTR$^m$ component 650 and a buffer 660. The trend server 640 is further operably coupled to a high-speed time series data analysis component 670. The high-speed time series analysis component 670 is further operably coupled to a rendering component 680 associated with a HMI 690. According to this aspect, data subsets are analyzed using high-speed time series data analysis. For example, autocorrelation is a correlation coefficient that represents the serial correlation of equally spaced time series between members of a data set. Autocorrelation is defined mathematically in terms of "lag," where, given measurements $X_1, X_2, \ldots, X_n$ at time $t_1, t_2, \ldots, t_n$, the lag k autocorrelation function is $$r_k = \frac{\sum_{i=1}^{n-k}(X_i - \overline{X})(X_{i+k} - \overline{X})}{\sum_{i=1}^{n}(X_i - \overline{X})^2}$$

(Note that the above equation does not incorporate the time variable, t, where it is assumed that samples are equally temporally spaced.)

One characteristic of time series data is that it is highly autocorrelated, which permits highly accurate predictions to be made regarding future data values. For example, the present invention can utilize an autocorrelation function to test data subsets for the existence of random data. Once the system verifies that no random data points are present, the autocorrelation function can be employed to identify an appropriate time series model. For example, an appropriate model can be a first order stationary time series, wherein the expected values of the time function remain the same for all times, t. According to another example, an appropriate model can be a second order stationary time series. It is to be understood that the present invention is not limited to time series analysis of data subsets. For example, the present invention can employ Multiple Regression Analysis when two or more independent variables are contemplated; Non-linear Regression Analysis when a linear relationship between two or more variables cannot be assumed; Trend Analysis when it cannot be assumed that the time series are equally spaced; Decomposition Analysis to determine and identify the existence of several simultaneously occurring patterns within a time series; Simple Moving Averages; Weighted Moving Averages; Exponential Smoothing Techniques; Adaptive Filters; Hodrick-Prescott Filters; Neural Networks capable of being trained to predict future dependent variable values, (e.g. Multi-Layer Feed-Forward Neural Networks, Partially Recurrent Neural Networks, etc); or any other suitable method for analysis of data subsets.

According to another aspect of the present invention, the system can transmit data asynchronously for example, whereby data characters are transmitted at unequal time intervals. This manner of data transmission requires each data character to comprise a start element and a stop element so that the data character can be delineated when it is received. Typical asynchronous transmission methods employ various checks to ensure transmission integrity. For example, the present system can utilize a block check character to ensure the accuracy of each transmitted message. A block check character is the 2's complement (radix complement of a binary number) of the 8-bit sum of all bytes of data in a transmission block. Additionally, the present invention can employ a cyclic redundancy check (CRC). A CRC is method of error detection in which characters in a data packet or message are expressed as a string of bits representing a binary number. This binary number is divided by a predetermined polynomial, and the remainder is added to the original message as the CRC character. When the data packet or message is received at its destination, a similar process is performed to verify that the integrity of the transmission has not been compromised.

With regard to the RTR$^m$ component 650, a system is disclosed as discussed in the "DataLogger Performance Enhancement RTR$^m$" paper relating to run-time data reduction. It will be noted that this paper is marked Copyright © Dynapro 1995–1996: However, this intellectual property was acquired by the assignee of the present invention, Rockwell Software/Rockwell Automation, when it purchased the Dynapro software business. This aspect of the present invention provides for data capture at high resolution and data logging at a hierarchy of multiple resolutions (e.g., if m=10 then 1 data point can be logged for every 1, 10, 100, 1000 etc data points that are captured), thereby indexing the data to provide an overview of the data. Thus, in the subject invention, the index itself can represent the entire data set. Furthermore, the index permits the data to be rendered via the index to facilitate trending of the data in an efficient manner. The following paragraphs emphasize the pertinent aspects of the RTR$^m$ paper, and is germane to the functionality of the RTR$^m$ component 650.

A "time partition modulo m" of a time interval is a subpartition of the interval into subintervals of sizes which are powers of m. Each subinterval can begin on an even multiple of a power of m. For example, if m=10, then the subpartition might begin at 345100 seconds, 345200 seconds, 345300 seconds, etc. This type of partition is important so that both the datalogger and trending component can agree upon where a particular sample is mapped. It is to be appreciated that, while the modulo, m, is assigned certain values herein, such values are arbitrary and given for exemplary purposes only. Indeed, m can be set to any desired value.

A "reduced time resolution file modulo m" (RTR$^m$) is a file in which the samples have been divided into a time partition modulo m, but in which only the maximum and minimum value samples for each subinterval have been recorded in the file. For example, consider the following dataset wherein powers of 2 (m=2) are utilized to segregate the data. Each record is described in terms of <Value, Time>

| | |
|---|---|
| Time resolution: 8 | <25,2><8125,3> |
| Time resolution: 4 | <25,2><8125,3><97,6><445,7> |
| Time resolution: 1 | <380,0><175,1><25,2><8125,3><125,4><195,5><97,6><445,7> |

(Note that in this case the time resolution 2 can be redundant.)

A datalogger model comprises numerous and varied file types. For example, one type of file can be a yymmddaa.dbf file, which comprises the time sequenced numeric tag values. For each datalogger base file, a hierarchy of RTR$^m$ files is created. Each RTR$^m$ file comprises data at a different time resolution in powers of m. Files can be named, for example, yymmddaa.00x, where x is the power of m resolution of a file (in seconds). For instance, if m is 10, file yymmddaa.002 comprises data at 100-second time resolution, file yymmddaa.003 comprises data at 1000-second time resolution, etc. The file hierarchy is illustrated in the following table:

| | Resolution Seconds | File Name | File Size |
|---|---|---|---|
| Reduced time resolution files | 1000 | rtr\960204.003 | 1/1500 |
| | 100 | rtr\960204.002 | 1/150 |
| | 10 | rtr\960204.001 | 1/15 |
| Base File | 1 | 960204.dbf | 1/1 |
| | | Total file size | 1.074 rtrfile |

The format of data within the RTR$^m$ files can be similar to a corresponding datalogger base file. However, RTR$^m$ data has reduced time resolution and is stored in a binary format. An advantage of this aspect of the invention is that it is not necessary that third-party applications be able to read the RTR$^m$ files.

RTR$^m$ files can be stored in a subdirectory of the model called "RTR". Each RTR$^m$ file has the same root name as a corresponding datalogger base file and has an extension that indicates the log of the time resolution in seconds. For example, a base file named 960203aa.dbf with a time resolution of 1000 seconds would have an associated RTR$^m$ file named RTR\960203aa.003 (because 003=$\log_{10}$ 1000). The file naming conventions and file storage structures described herein are exemplary only, and are not intended to be limiting in nature or scope. Numerous and varied storage structures are contemplated by the present invention such as, for example, storing reduced time resolution data in a database or memory.

For each tag being logged, a datalogger can maintain a hierarchy of extrema for different time resolutions. When a datalogger reads a new sample, it can determine whether a given time interval is complete and whether associated data needs to be written to disk. Furthermore, a datalogger can determine if the new sample represents a new extrema for any of the elements in a hierarchy.

RTR$^m$ files can be managed in the same manner as their corresponding datalogger base files. Each time a new base file is created, a new hierarchy of RTR$^m$ files can be created to incorporate the new base file. When the base file is deleted, all the RTR$^m$ files can also be deleted. When the base file is closed, those RTR$^m$ files that are either too large (e.g., file not sufficiently compressed) or too small (e.g., insufficient number of data in the file) can be deleted. Note, however, that by tying RTR$^m$ file management to a base file, management thereof will be a limit to the level of performance gains realized. For example, if a base file comprises 1 hour of data, then only modest performance gains are possible. If a base file comprises a week's worth of data, then large performance gains are possible. Hence managing RTR$^m$ files independent of the base files is desirable but more complicated.

Because RTR$^m$ files have the same format as datalogger base files (with the exception that they are binary), RTR$^m$ files can be manipulated utilizing the same code and/or algorithms as are employed with regard to base files.

As described above, this solution is expected to increase disk space consumption by a datalogger by less than 10% (this number will depend upon the value of m selected and is also an upper bound. In general the fractional requirement for extra storage for storing the RTR$^m$ files will be <=2/(3*(m-1)) (assuming a ⅓ reduction from ASCII to Binary)).

The analysis follows for case m=10: The $RTR^m$ files can be binary format, which results in at least a factor of 3 reduction in disk space usage. Each $RTR^m$ file in the hierarchy can store data at $\frac{1}{10}$ the resolution of the previous file. Since a minimum and maximum sample are required, the number of samples is reduced to $\frac{1}{5}$ for each file in a hierarchy. The resulting total size of all files is then given by $$\frac{1}{3} * (\frac{1}{5} + \frac{1}{50} + \frac{1}{500} + \ldots)$$

which is equal to:

$$\frac{1}{15} * (1 + \frac{1}{10} + \frac{1}{100} + \ldots)$$

This sum converges to:

$$\frac{1}{15} * (1/(1 - \frac{1}{10}))$$

which is about 7.5%.

If a hierarchy of 6 $RTR^m$ files are produced, then the logger might potentially have to hold 6 extra file handles open. However, for resolution periods of 1000 seconds or greater, the logger will only have to write to a file once every 16 minutes. Therefore, opening and closing these files as needed is not detrimentally inefficient to the present system.

Analog and/or digital tags logged by the datalogger can be maintained in a hierarchy of current maximum and minimum samples for different time resolutions. A sample can comprise a value and time that will occupy 10 bytes. Thus, if 10,000 tags are logged and a hierarchy of 6 $RTR^m$ levels are maintained, the logger will need to commit a minimum of 1,200,000 bytes of memory to producing the $RTR^m$ files.

Read-time performance is expected to be on the same order as the reduction in file size. For example, if an $RTR^{1000}$ file is $\frac{1}{1500}$ the size of a corresponding base file, the system can read the $RTR^{1000}$ file 1500 times faster than the corresponding base file can be read. Within a time range determined by the size of a datalogger base file, trend read-time performance should not vary by more than a factor of (m) 10. Consider the following case: 4 tags are logged every second and each file comprises 1 shift/8 hours of data, or 28,800 samples per tag. Let the largest resolution period be 1000 seconds. Now consider a trend that needs to display 7 days of data for the 4 tags: Using only the base datalog files would require reading 2,419,200 samples, which, at 500 samples/second, would require ~1.3 hours. Now consider the same display using the $RTR^{1000}$ files. This requires reading $\frac{1}{500}$ of the samples (4838 samples), which can be read at 1500 samples per second (because they are binary) and will require only 3 seconds. This aspect of the invention represents a 150000% speed improvement. If an $RTR^{10,000}$ file is utilized, then the data can be read in under 0.3 seconds, which can reduce and/or eliminate the limiting aspect of read-time.

Figure 7:
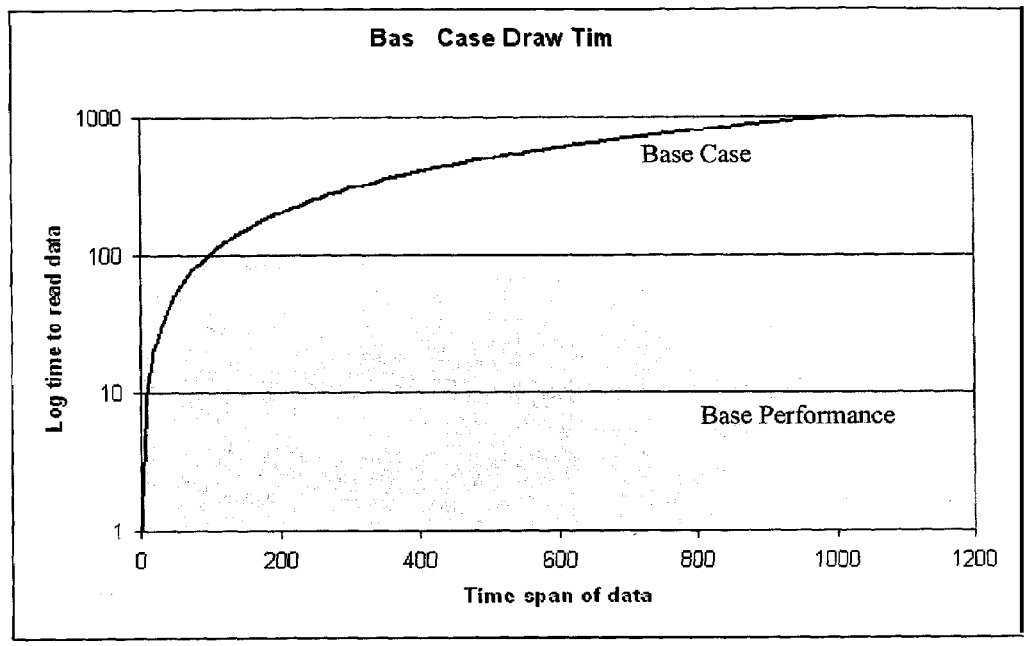
FIGS. 7 and 8 are graphical illustrations of performance characteristics associated with an aspect of the present invention.
Figure 8:
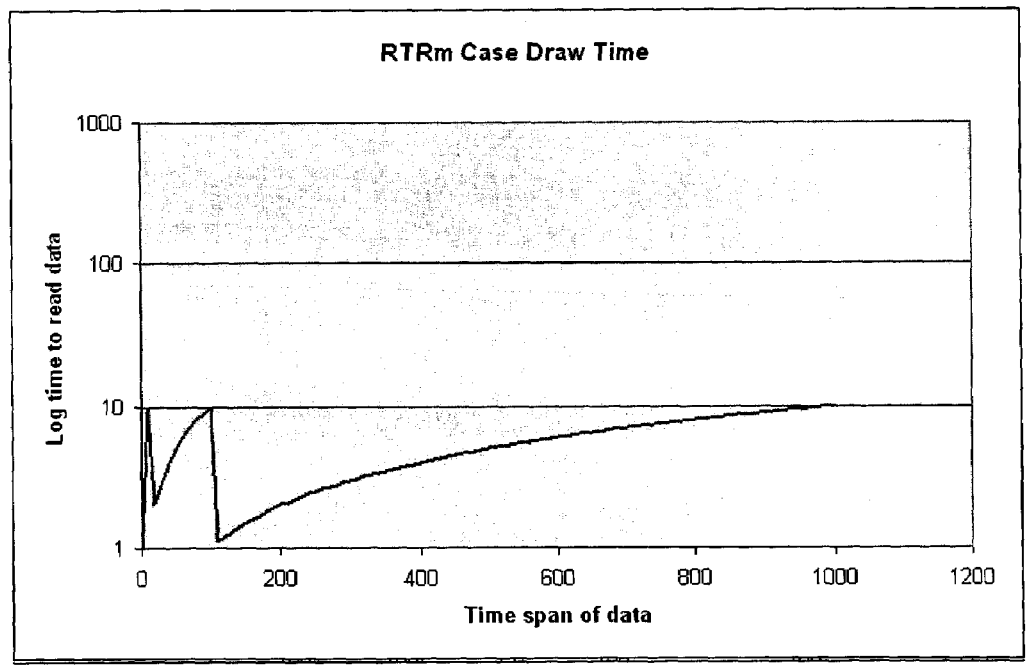

FIGS. 7 and 8 illustrate the difference in performance characteristics between using the datalogger base files and the $RTR^m$ files. Because of the large performance differences a logarithmic scale is used. The base case draw-time is a linear function of the number of samples the trend must read. The $RTR^m$ file case is a modified saw tooth function, bounded above, of the number of samples read until the lowest resolution file is in use.

If the time required to write is proportional to the number of bytes written, then the amount of time required to write values to files will increase by the same amount as the disk space usage, or 7.5%. If the time spent writing is proportional to the number of records written, then the time spent writing will increase by 22.5%. Not every minimum and maximum in a hierarchy need be checked against every new sample. If a new sample is not an extrema for resolution period r, then it will not be an extrema for all resolution periods greater than r.

Turning briefly to FIGS. 9, 10, 11, 12, and 13, methodologies that can be implemented in accordance with the present invention are illustrated. While, for purposes of simplicity of explanation, the methodologies are shown and described as a series of blocks, it is to be understood and appreciated that the present invention is not limited by the order of the blocks, as some blocks can, in accordance with the present invention, occur in different orders and/or concurrently with other blocks from that shown and described herein. Moreover, not all illustrated blocks may be required to implement the methodologies in accordance with the present invention.

Figure 9:
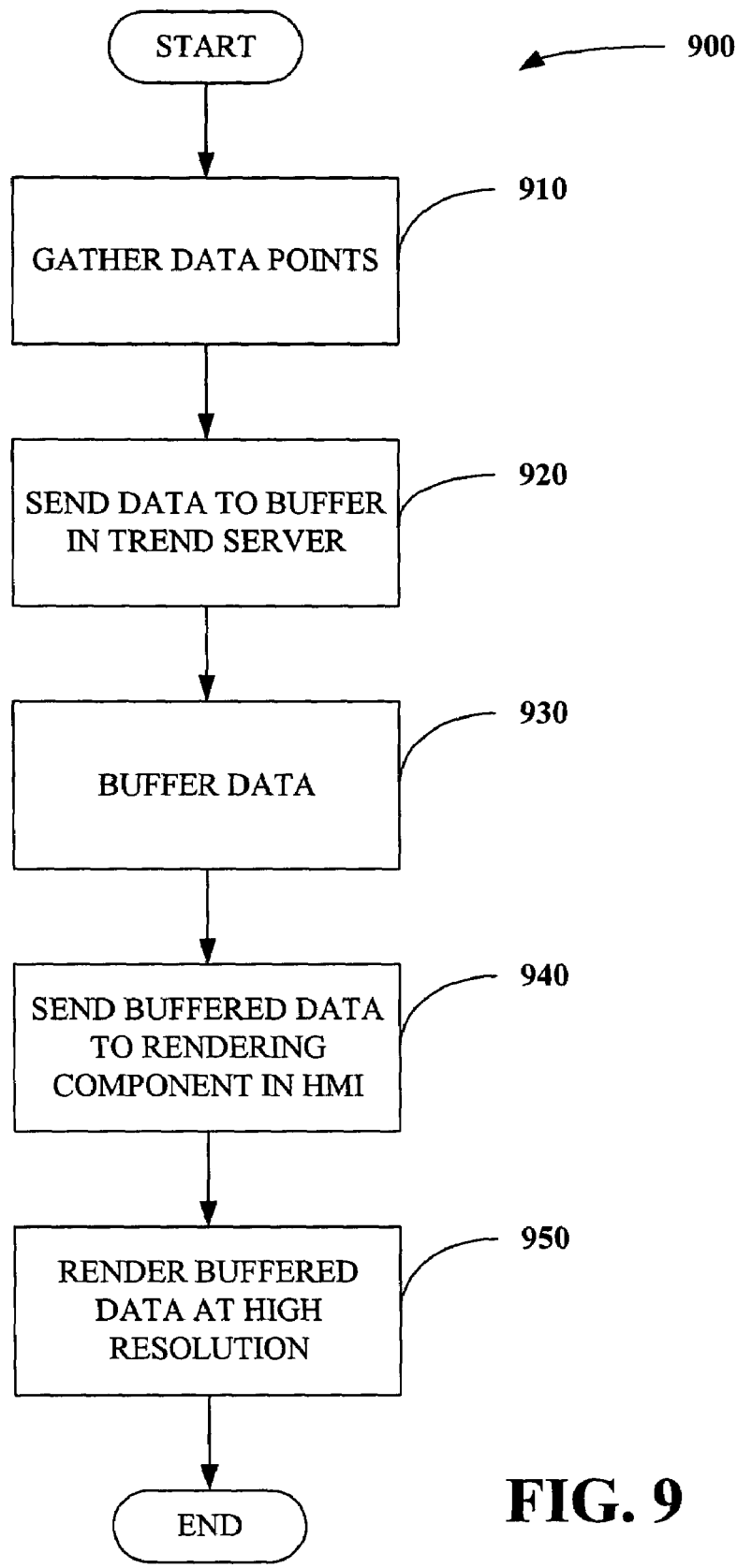
FIG. 9 is an illustration of a flow diagram of a methodology for reducing run-time data in accordance with an aspect of the present invention.

FIG. 9 is an illustration of a methodology 900 in accordance with an aspect of the present invention. Data points are gathered at 910 and sent to a buffer associated with a trend server at 920. The buffer associated with the trend server buffers the data by prioritizing and temporarily storing data points at 930. Buffered data is sent to the rendering component located in the HMI at 940. Upon receipt of the buffered data points, the rendering component outputs the data in high-resolution format, thereby updating the HMI at 950. The format of the rendered data can be graphical, aural, visual (e.g. LED or other light source, etc.), tactile, or any other suitable rendering of data.

Figure 10:
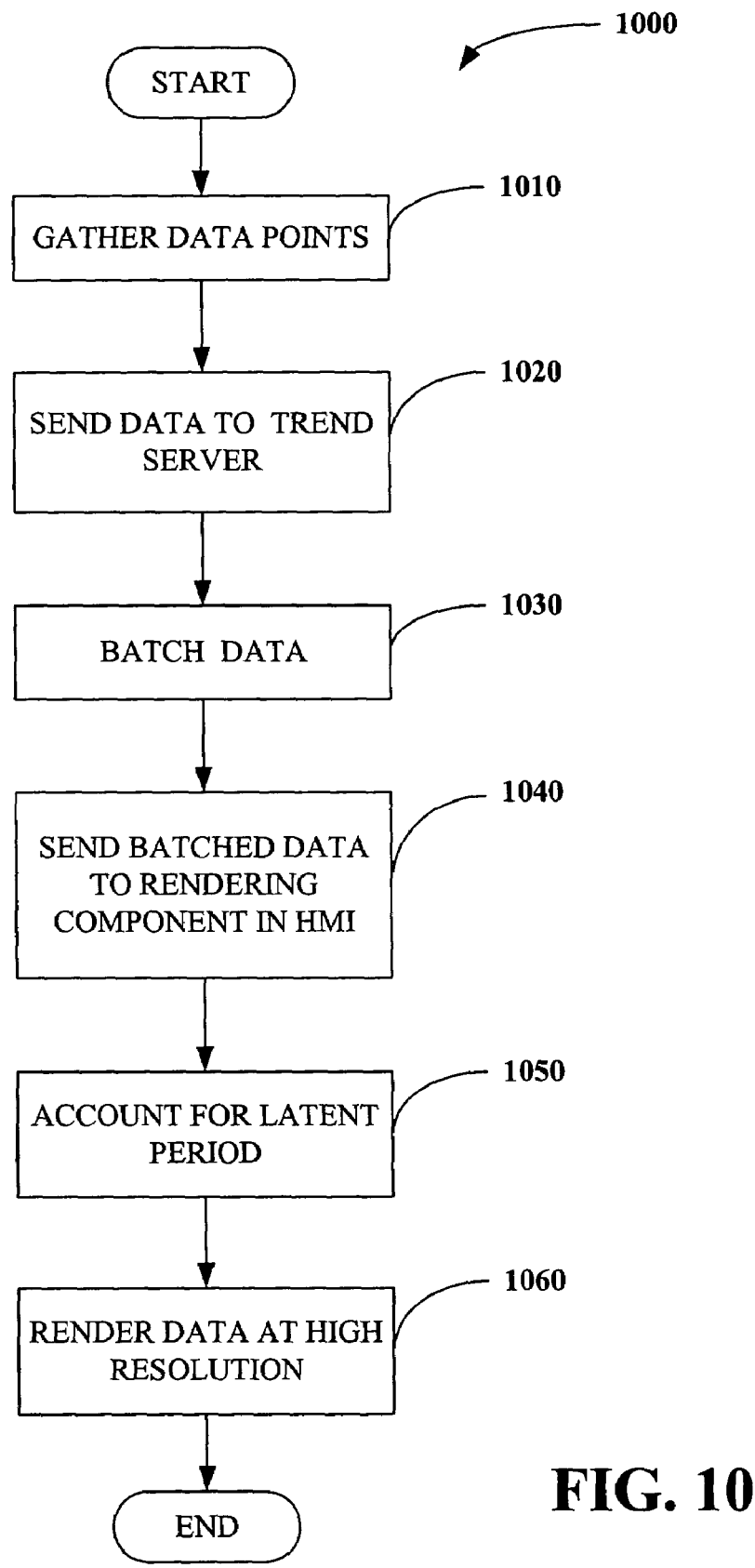
FIG. 10 is an illustration of a flow diagram of a methodology for reducing run-time data in accordance with an aspect of the present invention.

FIG. 10 is an illustration of a methodology 1000 in accordance with an aspect of the present invention. The methodology 1000 comprises the collection of data points at 1010, which are sent to a trend server at 1020. The trend server batches the data points, rather than buffering them, at 1030. Batched data is sent to the rendering component of the HMI at 1040. The rendering component has a priori knowledge of the inherent latent period that arises during batching of the data by the trend server and accounts for the latent period at 1050. At 1060 the data is displayed at high resolution by a rendering component. According to this methodology, the trend server does not perform any analysis of the data, but rather packages the data for transmission to a HMI in a meaningful manner. The HMI, having knowledge of the period of latency with respect to data transmitted by the trend server, can make any necessary adjustments to the output flow rate to ensure that data are rendered seamlessly. This aspect of the present invention ensures that the user can be presented with a constant, seamless, and meaningful display of data via the HMI.

Figure 11:
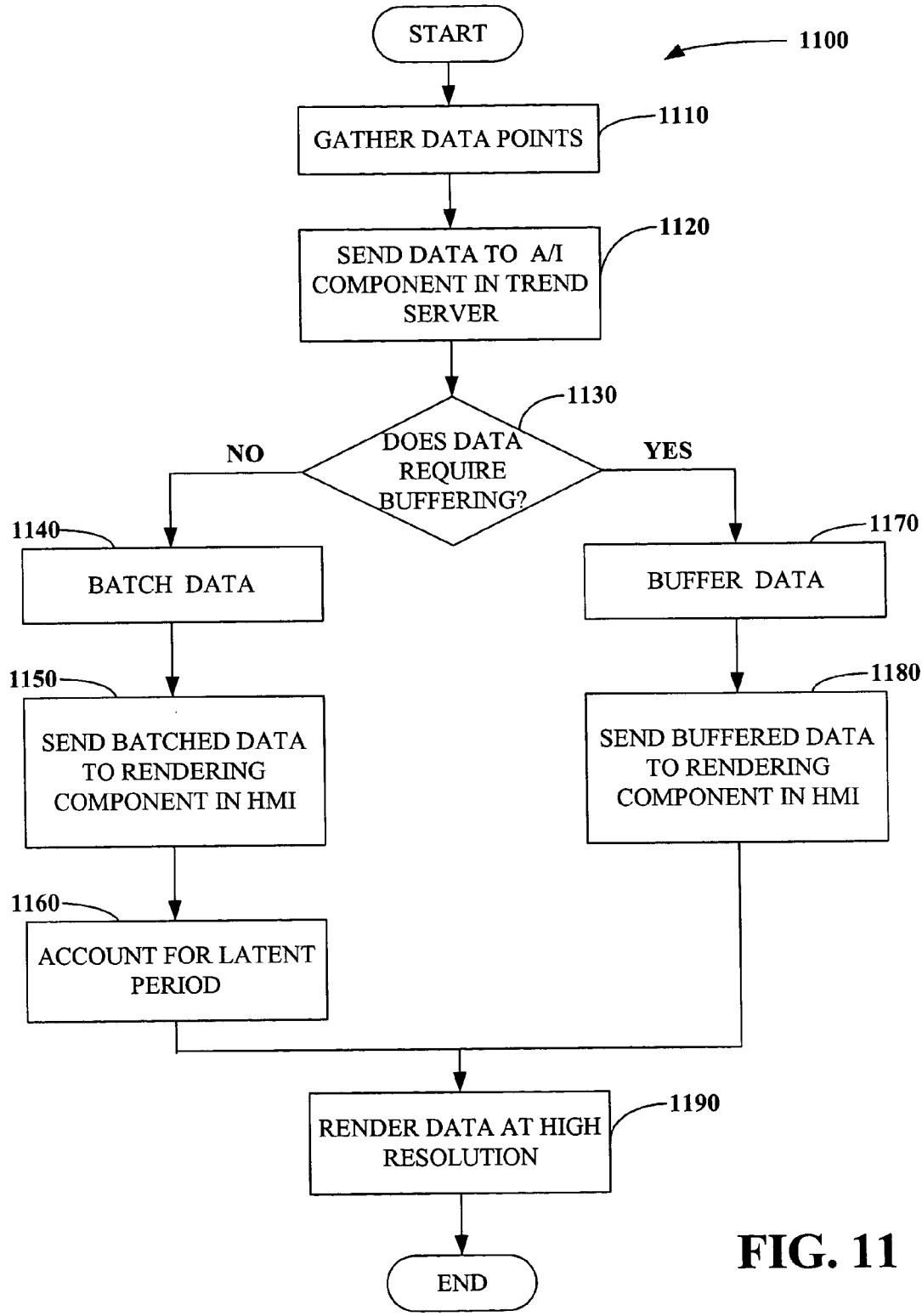
FIG. 11 is an illustration of a flow diagram of a methodology for reducing run-time data in accordance with an aspect of the present invention.

FIG. 11 is an illustration of a methodology 1100 in accordance with an aspect of the present invention. According to the methodology 1100, data is gathered at 1110 and sent to an A/I component in a trend server at 1120. At 1130, the A/I component makes a determination of whether the data requires buffering before transmission to a rendering component of a HMI. The determination of whether to buffer the data can be based on, for example, the volume of the data (e.g. whether the number of data exceeds that which the rendering component of the HMI can output in a seamless, high-resolution display, etc.), the priority of the data (e.g., whether the data represent a fault condition, etc.), etc. If the A/I component determines that the data does not require buffering, then the trend server can batch the data at 1140 for transmission to the rendering component of the HMI at 1150. The HMI has a priori knowledge of a latent period that occurs during batching of the data by the trend server. At 1160, the HMI accounts for the latent period to ensure that the output of data is seamless. At 1190, the data is rendered at high resolution in an efficient, seamless, and meaningful manner. Alternatively, if the A/I component determines that the data does require buffering at 1130, then the methodology 1100 proceeds to 1170, where the data is buffered by the buffer associated with the trend server. At 1180, the buffered data is transmitted to the rendering component of the HMI. The data is then rendered at high resolution by the rendering component at 1190 to provide a seamless and informative display to the user.

Figure 12:
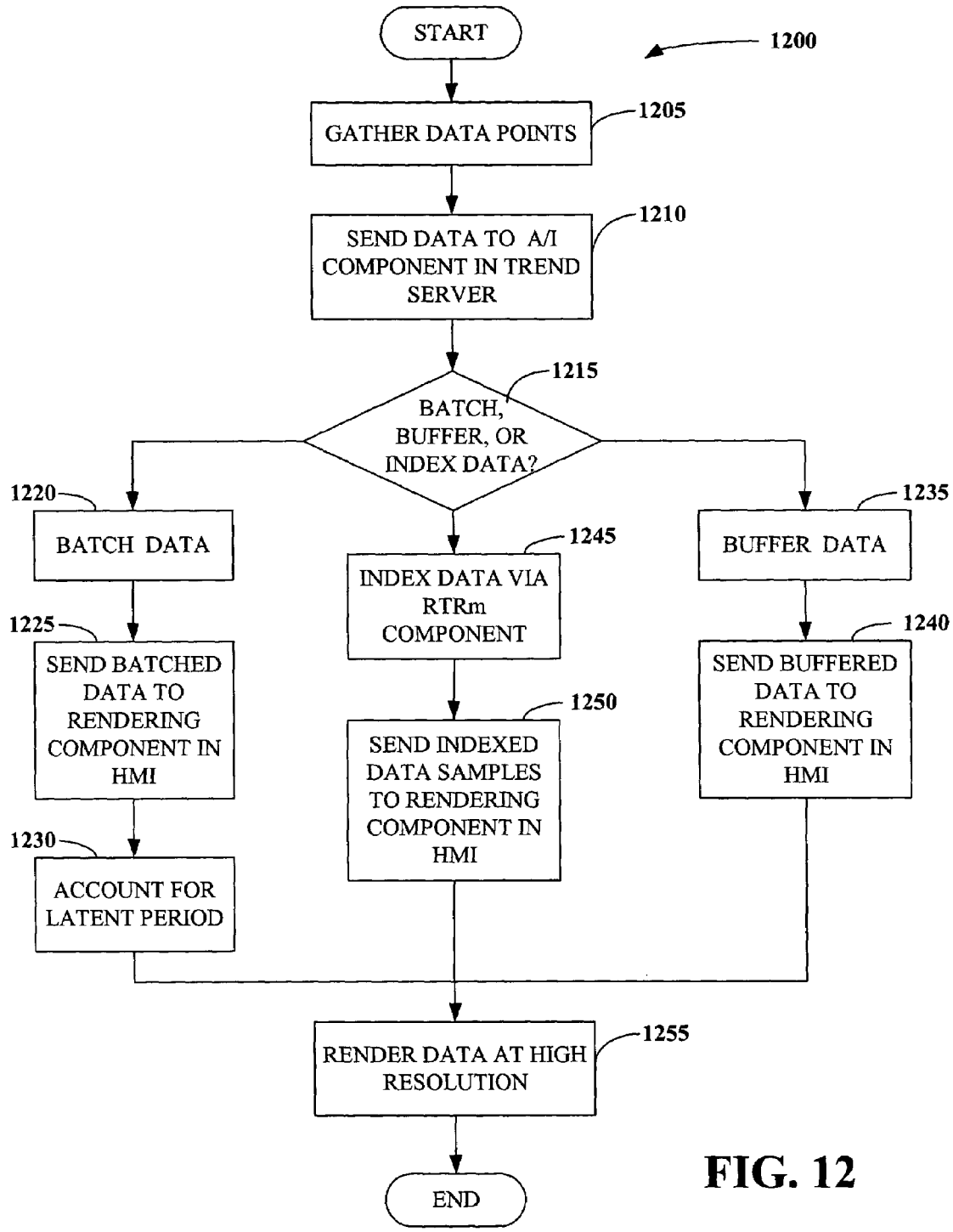
FIG. 12 is an illustration of a flow diagram of a methodology for reducing run-time data in accordance with an aspect of the present invention.

FIG. 12 is an illustration of a flow diagram of a methodology 1200 according to an aspect of the present invention. Data points are gathered at 1205 and sent to an A/I component associated with a trend server at 1210. At 1215, the A/I component is employed to determine whether the data requires batching, buffering, or indexing. If the A/I component determines that the data should be batched before it is rendered to a user, the methodology proceeds to 1220, where data is batched. Batched data is transmitted to a rendering component associated with a HMI at 1225. The HMI accounts for any latent period that can have arisen during data batching at 1230 to ensure that data is rendered seamlessly and in a manner that is meaningful and uninterrupted. At 1255, data is rendered at high resolution to a user.

Still referring to FIG. 12, the A/I component can determine at 1215 that the data should be buffered before it is rendered to a user. If the A/I component makes such a determination, then the data is buffered at 1235 and sent to a rendering component associated with a HMI at 1240. Buffering the data permits the present system to render data at high resolution in a seamless manner to a user at 1255.

If the A/I component determines at 1215 that indexing the data will effectuate the most desirable rendering of data to a user, then the methodology can proceed to 1245, where data is indexed via the RTR$^m$ component associated with a trend server discussed in detail supra. Indexed data is sent to a rendering component associated with a HMI at 1250, and the indexed data is seamlessly rendered at high resolution to a user at 1255.

Figure 13:
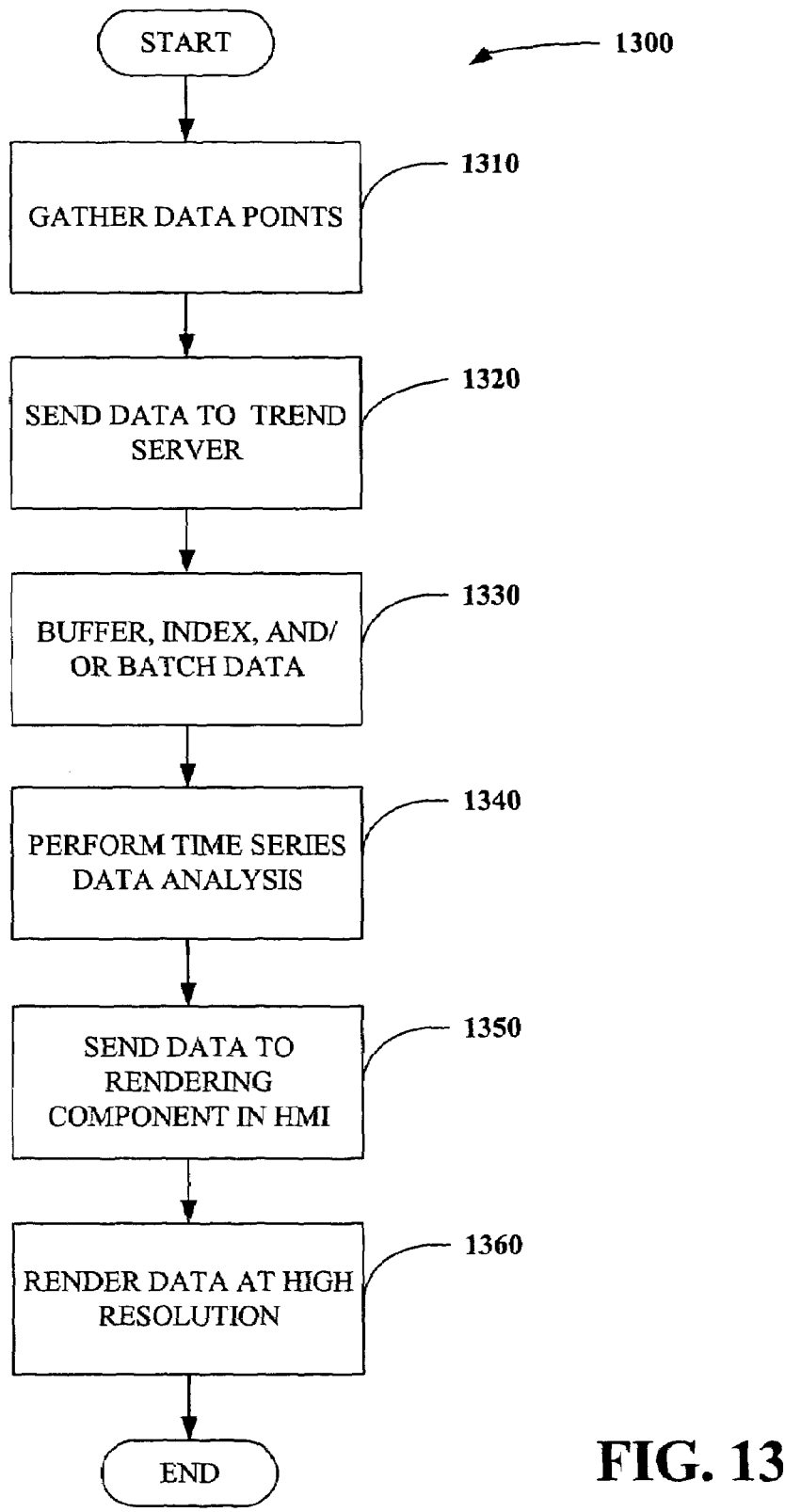
FIG. 13 is an illustration of a flow diagram of a methodology for reducing run-time data in accordance with an aspect of the present invention.

FIG. 13 is an illustration of a flow diagram of a methodology 1300 according to an aspect of the present invention. Data is collected at 1310 by a high-speed data collection component. At 1320, data is sent to a trend server. An A/I component can determine whether the data should be buffered and/or batched by the trend server at 1330, and the trend server performs the required action. At 1340, an analysis component performs time series data analysis on subsets of the batched or buffered data. When the analysis is complete, the data is sent to the HMI, as illustrated at 1350. Finally, the data is rendered at high resolution at 1360 in a meaningful manner.

Figure 14:
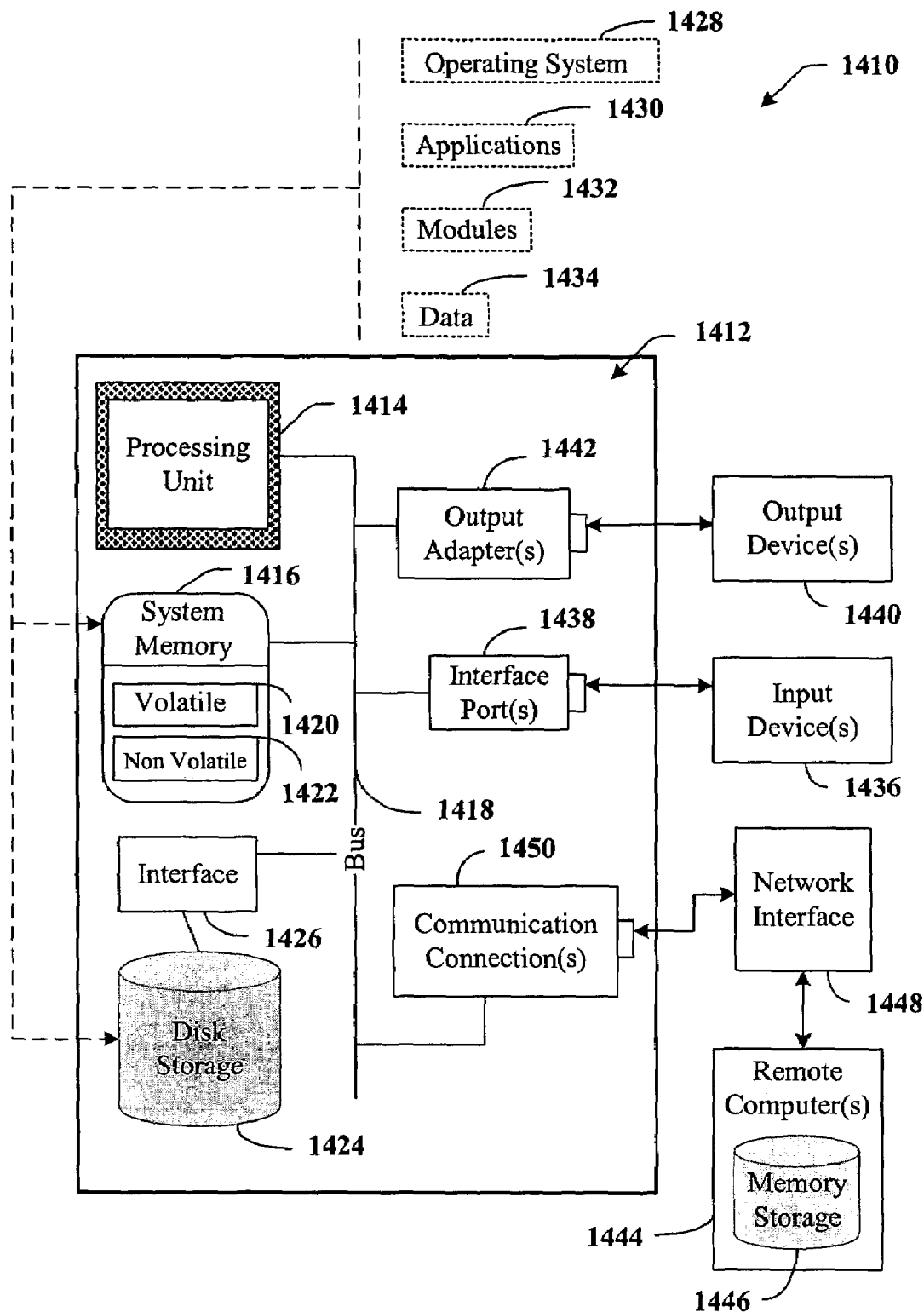
FIGS. 14 and 15 are illustrations of exemplary computing systems and/or environments in connection with facilitating employment of the subject invention.
Figure 15:
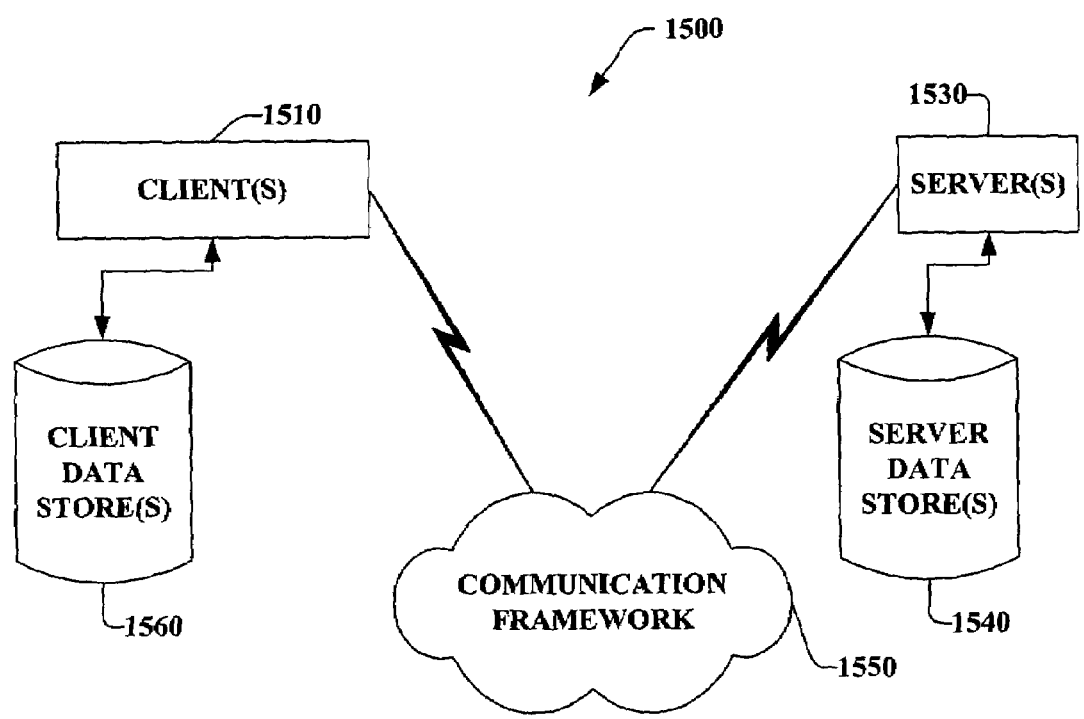

In order to provide a context for the various aspects of the invention, FIGS. 14 and 15 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), comprising the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428.

Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port can be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample-computing environment 1500 with which the present invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the present invention, for example. One possible communication between a client 1510 and a server 1530 can be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the servers 1530.

What has been described above includes examples of the present invention. It is, of course, not possible to describe every conceivable combination of components or methodologies for purposes of describing the present invention, but one of ordinary skill in the art can recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates rendering data in an industrial automation environment, comprising:
   a high-speed data collection component that collects data at a rate of at least 100 samples per second per tag;
   an $RTR^m$ component that indexes data;
   a trend server that processes the collected data, the trend server comprising:
      a buffer that temporarily stores data; and
      an artificial intelligence (A/I) component associated with the buffer that determines whether the collected data requires buffering based at least in part upon one of priority of the collected data and volume of the collected data; and
   a rendering component that seamlessly renders the processed data.

2. The system of claim 1, the high-speed data collection component comprising at least one programmable logic controller (PLC).

3. The system of claim 1, the high-speed data collection component comprising at least one "soft" programmable logic controller (PLC).

4. The system of claim 1, the high-speed data collection component samples data at a rate between 100 and 1000 samples per second per tag.

5. The system of claim 4, the high-speed data collection component samples data at a rate between 100 and 300 samples per second per tag.

6. The system of claim 4, the high-speed data collection component samples data at a rate between 300 and 500 samples per second per tag.

7. The system of claim 4, the high-speed data collection component samples data at a rate between 500 and 1000 samples per second per tag.

8. The system of claim 1, the A/I component comprising implicitly and/or explicitly trained classifiers.

9. The system of claim 1, the A/I component facilitates dynamic adjustment of buffer size via proactive analysis of a data stream.

10. The system of claim 1, the A/I component facilitates dynamic adjustment of a sample rate.

11. The system of claim 1, the A/I component comprising at least one probabilistic analysis algorithm to determine and/or infer whether data requires buffering.

12. The system of claim 1, the A/I component comprising at least one prognostic analysis algorithm to determine and/or infer whether data requires buffering.

13. The system of claim 1, the A/I component comprising at least one utility-based analysis algorithm to determine and/or infer whether data requires buffering.

14. The system of claim 13, the at least one utility-based analysis algorithm assesses information associated with user preference-based cost-benefit analysis.

15. The system of claim 14, the preference-based cost-benefit analysis is based at least in part on a determination and/or inference regarding reconciliation of system resource expenditure with a desire for a high-resolution rendering of data.

16. The system of claim 1, the A/I component employs a user profile to make inferences regarding rendering data to a user.

17. The system of claim 16, the A/I component employs historical user information to make inferences regarding rendering data to the user.

18. The system of claim 1, comprising a Human Machine Interface.

19. The system of claim 18, the Human Machine Interface comprising at least one of a fixed Human Machine Interface, a tethered portable Human Machine Interface, and a wireless Human Machine Interface.

20. The system of claim 1, comprising a high-speed time series data analysis component operably coupled to the trend server and the Human Machine Interface.

21. The system of claim 1, the RTR$^m$ component provides performance gains that are directly proportional to the number of indexed data points.

22. A computer-implemented method that facilitates rendering data in an industrial automation environment, comprising:
  collecting data at a high-resolution rate of at least 50 samples per second per tag;
  inferring that high-resolution data requires buffering based in part upon one of priority of the high-resolution data and volume of the high resolution data; processing the high-resolution data;
  employing a run-time data reduction (RTR$^m$) component to index the high-resolution data; and
  rendering the high-resolution output data on a user interface.

23. The method of claim 22, the high-resolution data is collected via employing at least one programmable logic controller (PLC).

24. The method of claim 22, the high-resolution data is collected via employing at least one "soft" programmable logic controller (PLC).

25. The method of claim 22, the high-resolution data is collected at a rate of between 50 and 1000 samples per second per tag.

26. The method of claim 22, the high-resolution data is collected at a rate of between 50 and 300 samples per second per tag.

27. The method of claim 22, the high-resolution data is collected at a rate of between 300 and 500 samples per second per tag.

28. The method of claim 22, the high-resolution data is collected at a rate of between 500 and 1000 samples per second per tag.

29. The method of claim 22, the high-resolution data is processed via employing a trend server.

30. The method of claim 29, the processing of the high-resolution data is effectuated by at least one of batching the data and buffering the data.

31. The method of claim 29, the high-resolution data is buffered via employing a buffer associated with the trend server.

32. The method of claim 29, the high-resolution data is batched via employing the trend server.

33. The method of claim 22, the high-resolution data is rendered via employing at least one of a fixed Human Machine Interface, a tethered portable Human Machine Interface, and a wireless Human Machine Interface.

34. The method of claim 33, the high-resolution data is rendered seamlessly.

35. The method of claim 33, the Human Machine Interface presents a scroll bar to permit a user to seamlessly view historical data.

36. The method of claim 22, wherein RTR$^m$ performance efficiency increases with the number of data points indexed.

37. A computer-implemented method that facilitates rendering data in an industrial automation environment, comprising:
  means for collecting high-resolution data;
  means for processing high-resolution data;
  means for reducing run-time of high resolution data; and
  means for rendering high-resolution data on a user interfaces means for inferring that high-resolution data requires buffering prior to transmission of high resolution data to the means for rendering.

38. The method of claim 37, the means for collecting high-resolution data comprising at least one of a hardware means and a software means.

39. The method of claim 37, the means for collecting high-resolution data collects data at a rate of at least 50 samples per second per tag.

40. The method of claim 39, the means for collecting high-resolution data collects data at a rate between 50 and 1000 samples per second per tag.

41. The method of claim 40, the means for collecting high-resolution data collects data at a rate of approximately 200 samples per second per tag.

42. The method of claim 37, the means for processing high-resolution data further comprising at least one of means for batching the high-resolution data and means for buffering the high-resolution data.

43. The method of claim 37, the means for processing high-resolution data comprising means for sampling and indexing the high-resolution data.

44. The method of claim 37, the means for rendering high-resolution data comprising at least one of a fixed means, a tethered portable means, and a wireless means.

45. The method of claim 37, the means for rendering high-resolution data comprising means for scrolling through historical data.

46. The method of claim 37, the means for rendering high-resolution data comprising means for presenting a seamless display to a user.

* * * * *